United States Patent [19]

Sakaguchi

[11] Patent Number: 4,936,635
[45] Date of Patent: Jun. 26, 1990

[54] BRAKE BOOSTER
[75] Inventor: Shozo Sakaguchi, Saitama, Japan
[73] Assignee: Jidosha Kiki Co., Ltd., Tokyo, Japan
[21] Appl. No.: 327,509
[22] Filed: Mar. 22, 1989
[30] Foreign Application Priority Data
   Apr. 11, 1988 [JP]  Japan .............................. 63-48631[U]
[51] Int. Cl.⁵ .............................................. F16B 9/10
[52] U.S. Cl. .................................... 303/4; 91/376 R; 92/98 R; 277/152
[58] Field of Search .......................... 303/114, 12, 4; 91/376 R, 389.1; 277/152; 212 R, 212 F, 212 C; 92/89, 96, 98 R, 101, 98 D

[56]         References Cited
       U.S. PATENT DOCUMENTS

| | | | |
|---|---|---|---|
| 2,438,723 | 3/1948 | Stelzer | 91/376 |
| 3,013,537 | 12/1961 | Schultz | 91/376 |
| 3,958,497 | 5/1976 | Gardner et al. | 92/48 |
| 4,100,839 | 7/1978 | Ando | 92/98 R |
| 4,298,184 | 11/1981 | Grunert et al. | 277/152 X |
| 4,482,160 | 11/1984 | Yanagi et al. | 277/152 X |
| 4,505,351 | 3/1985 | Nishikawa et al. | 303/114 X |
| 4,534,270 | 8/1985 | Nishii | 91/376 R |
| 4,738,186 | 4/1988 | Rossigno et al. | 92/98 D |
| 4,787,292 | 11/1988 | Tsuyuki et al. | 91/369.3 |
| 4,794,844 | 1/1989 | Taft | 91/376 R |
| 4,821,623 | 4/1989 | Shinohara | 91/376 R |
| 4,825,750 | 5/1989 | Rudiger et al. | 91/376 R |

FOREIGN PATENT DOCUMENTS 2131499  6/1984  United Kingdom ............. 188/73.45

Primary Examiner—Andres Kashnikow
Assistant Examiner—Matthew C. Graham
Attorney, Agent, or Firm—Flynn, Thiel, Boutell & Tanis

[57]         ABSTRACT

An improved diaphragm is disclosed which partitions the interior of a shell of a brake booster into a constant pressure chamber and a variable pressure chamber. The diaphragm includes a bead which extends around its inner periphery, and which is formed with a lip extending from the side of the constant pressure chamber to the side of the variable pressure chamber. The lip is held in close contact with the outer peripheral surface of a valve body. The lip is capable of an elastic deformation in a flexible manner, whereby a good seal against the outer peripheral surface of the valve body is maintained.

6 Claims, 2 Drawing Sheets

BRAKE BOOSTER

FIELD OF THE INVENTION

The invention relates to a brake booster, and more particularly, to an improvement of a diaphragm which partitions the interior of a shell of a brake booster into a constant pressure chamber and a variable pressure chamber.

DESCRIPTION OF THE PRIOR ART

A brake booster is well known in the art including a valve body which is reciprocably disposed in a shell, and a diaphragm applied to the back surface of a power piston which is mounted on the valve body to extend across the inner peripheral surface of the shell and the outer peripheral surface of the valve body to partition the interior of the shell into a constant pressure chamber and a variable pressure chamber.

In a conventional brake booster, a diaphragm is usually formed of a rubber and is formed with a bore extending therethrough in its axial portion, into which a valve body formed of a synthetic resin is a press fit. A bead extending around the inner periphery of the diaphragm is held in tight contact around the outer peripheral surface of the valve body by its own resilience, thus maintaining a hermetic seal between the connected portions of the valve body and the diaphragm.

In the conventional practice, the bead extending around the inner periphery of the diaphragm is substantially rectangular in section. Since the overall bead around the inner periphery of the diaphragm experiences an elastic deformation so as to bring it into close contact with the outer peripheral surface of the valve body, the elastic deformation of the bead may be excessive during the assembly, causing a local lift thereof from its close contact with the outer peripheral surface of the valve body, thus causing a likelihood of leakage through the seal.

It is also to be noted that a brake booster is subject to a temperature rise due to thermal influences of an associated engine, and thus the valve body and the bead extending around the inner periphery of the diaphragm experience a thermal expansion. A difference in the rate of thermal expansion may cause an excessive elastic deformation of the bead, again causing a likelihood of a leakage.

SUMMARY OF THE INVENTION

In view of the foregoing, in accordance with the invention, the bead extending around the inner periphery of the diaphragm is formed with a lip which extends from the constant pressure chamber side to the variable pressure chamber side and which is adapted to be held in close contact with the outer peripheral surface of the valve body, in a brake booster as mentioned above.

With this construction, a greater magnitude of elastic deformation of the lip is allowed as compared with an elastic deformation of the entire bead as is conventional in the prior art. Accordingly, if a difference of the diameter between the internal diameter of the diaphragm and the outer diameter of the valve body is larger than the conventional type, during assembly, the lip may be subject to an elastic deformation in a flexible manner. If the bead is subject to a thermal expansion, the lip may be caused to experience an elastic deformation in a flexible manner in accompanying relationship with a variation in the outer diameter of the valve body, thus allowing a good seal to be maintianed with respect to the outer peripheral surface of the valve body.

Above and other objects, features and advantages of the invention will become apparent from the following description of an embodiment thereof with reference to the drawings.

DETAILED DESCRIPTION OF EMBODIMENT

Figure 1:
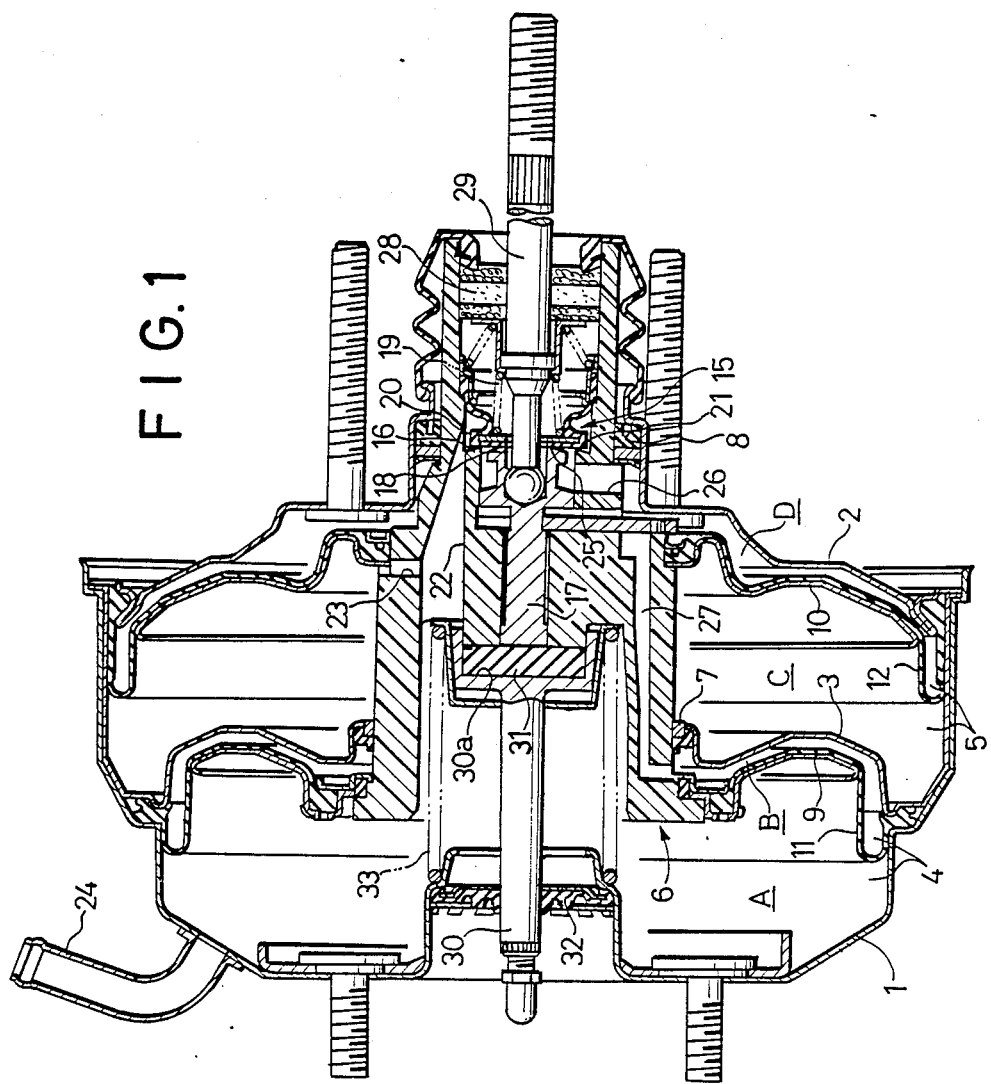
FIG. 1 is a longitudinal section, partly in elevation, of an embodiment of the invention.

Referring to the drawings, an embodiment of the invention will be described. An enclosed vessel is defined by a front shell 1 and a rear shell 2, and a center plate 3 is centrally disposed therein to partition the interior of the vessel into a front chamber 4 and a rear chamber 5 on the opposite sides thereof. A substantially cylindrical valve body 6, which is formed of a synthetic resin, slidably extends through axial portisons of the rear shell 2 and the center plate 3, with a hermatic seal being maintained by seal members 7 and 8, repectively.

A front power piston 9 and a rear power piston 10 are received in the front chamber 4 and the rear chamber 5, respectively, and are connected to the valve body 6. A front diaphragm 11 and a rear diaphragm 12 are applied to the back surface of the respective power pistons 9, 10, thus defining a constant pressure chamber A and a variable pressure chamber B on the opposite sides of the diaphragm 11 and also defining a constant pressure chamber C and a variable pressure chamber D on the opposite sides of the diaphragm 12.

a valve mechanism 15 which switches a fluid circuit between the pair of constant pressure chambers A, C and the pair of variable pressure chambers B, D is disposed within the valve body 6, and comprises a first annular valve seat 16 formed on the valve body 6, a second annular valve seat 18 formed on the right end of a valve plunger 17 which is slidably disposed within the valve body 6 and which is located radially inward of the valve seat 16, and a valve element 20 which is urged by a spring 19 so as to be seated upon the valve seats 16, 18 from the right side, as viewed in FIG. 1.

The first valve seat 16 and the valve element 20 include first annular seats 21 where they engage each other. A space radially outward of the first annular seats 21 communicates with the constant pressure chambers A and C through an axial passage 22 and a radial passage 23, both formed in the valve body 6. The constant pressure chamber A communicates with an intake manifold, not shown, through a tubing 24 mounted on the front shell 1 for introducing a negative pressure.

On the other hand, the second valve seat 18 and the valve element 20 include second annular seats 25 which are located radially inward of the first annular seats 21 and where they engage each other. A space intermediate the both annular seats 21, 25 communicate with the variable pressure chamber D through a radial passage 26 formed in the valve body 6, and thence to the variable pressure chamber B through an axial passage 27 formed in the valve body 6. Finally, a space located radially inward of the second annular seats 25 communicates with the atmosphere through a filter 28.

The valve plunger 17 which is slidably disposed within the valve body 6 has its right end connected to an input shaft 29 which is mechanically coupled to a brake pedal, not shown, while its left end is disposed in opposing relationship with the right end face of a reaction disc 31 received in a recess 30a which is formed in one end of a push rod 30. The left end of the push rod 30 slidably extends through an axial portion of the front shell 1 and through a seal member 32 to the exterior thereof for connection with a piston of a master cylinder, not shown. The valve body 6 is normally maintained in its inoperative position shown by a return spring 33.

Figure 2:
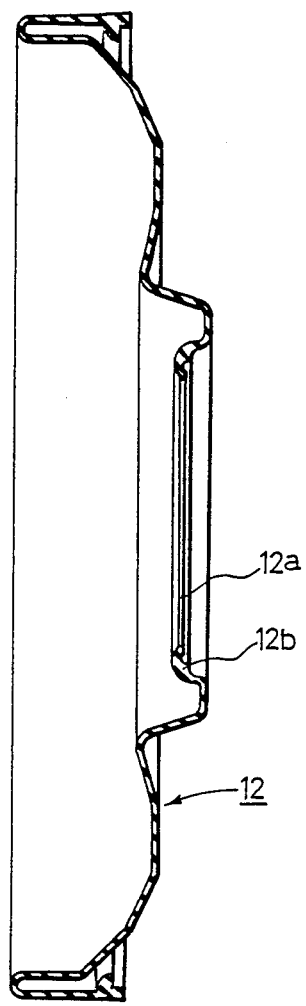
FIG. 2 is an enlarged section of a rear diaphragm 12 shown in FIG. 1.
Figure 3:
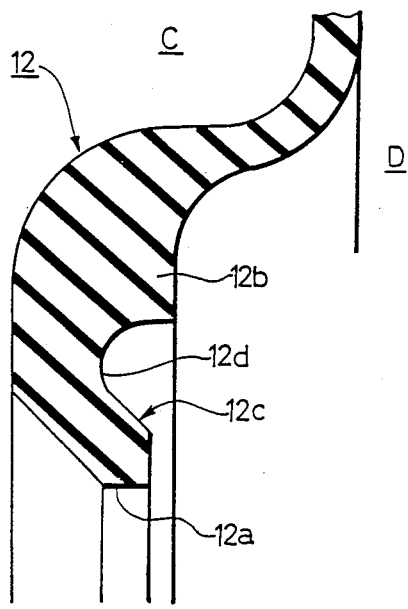
FIG. 3 is an enlarged view of part of FIG. 2.

Referring to FIGS. 2 and 3, the rear diaphragm 12 is formed of rubber and is molded to be substantially dish-shaped in section. The diaphragm 12 is centrally formed with a bore 12a, in which the valve body 6 is a press fit. The bore 12a is defined by a bead 12b extending around the inner periphery of the rear diaphragm 12. As shown in enlarged section form in FIG. 3, the bead 12b is formed with a lip 12c which extends radially inward at an angle of about 45°, as viewed from the constant pressure chamber C toward the variable pressure chamber D. The outer periphery of the lip 12c which is disposed nearer the variable pressure chamber D is formed with a relieved portion 12d, which allows the free end of the lip 12c, located nearer the variable pressure chamber D, to be capable of an elastic deformation in the radial direction of the valve body 6.

With this construction, when the rear diaphragm 12 is mounted on the valve body 6, the peripheral surface of the valve body 6 causes the lip 12c to undergo an elastic deformation toward the relieved portion 12d or in a direction radially outward while maintaining it in close contact with the peripheral surface of the valve body 6, thus maintaining a hermetic seal therebetween.

When an elastic deformation of the lip 12c is utilized to achieve a close contact thereof with respect to the outer peripheral surface of the valve body 6, it will be appreciated that a greater amount of elastic deformation is enabled as compared with a conventional arrangement which is devoid of the lip 12c and in which the entire bead experiences an elastic deformation. Accordingly, when assembling the front diaphragm 12 with the valve body 6, a difference of the diameter between the internal diameter of the lip 12c and the outer diameter of the valve body 6 does not prevent a good seal from being obtained by virtue of an increased magnitude of elastic deformation of the lip 12c.

When the valve body 6 and the bead 12b are subject to a thermal expansion, an increased magnitude of elastic deformation of the lip 12c allows it to accompany with a variation in the outer diameter of the valve body 6 in a satisfactory manner, thus allowing a seal against the outer peripheral surface of the valve body to be favorably maintained.

It will be noted that the atmospheric pressure which is introduced into the variable pressure chamber D acts upon the lip 12c to urge it against the outer peripheral surface of the valve body 6, thus contributing to the achievement of a reliable seal of the lip 12c against the other peripheral surface of the valve body 6.

While the invention has been disclosed above in connection with an embodiment thereof, it should be understood that a number of changes, modifications and substitutions will readily occur to one skilled in the art without departing from the spirit and scope of the invention defined by the appended claims.

What is claimed is:

1. A brake booster including a valve body which is reciprocably disposed within a shell, and a diaphragm applied to the back surface of a power piston which is coaxially mounted on the valve body so as to extend across the inner peripheral surface of the shell and the outer peripheral surface of the valve body and to partition the interior of the shell into a constant pressure chamber and a variable pressure chamber;

wherein the diaphragm includes a bead extending around its inner periphery, which is formed with a lip extending from the side of the constant pressure chamber to the side of the variable pressure chamber, said power piston including an annular portion which snugly radially encases said bead such that said bead is snugly radially compressed between said annular portion of said power piston and said valve body, the lip being held in close contact with the outer peripheral surface of the valve body.

2. A brake booster according to claim 1 in which an outer periphery of the lip which is located nearer the variable pressure chamber is formed with a relieved portion.

3. A brake booster according to claim 1 in which the lip extends radially inward at an angle substantially equal to 45°.

4. A brake booster according to claim 1, wherein said lip is made from an elatic material, said lip moving elastically both toward and away from said annular portion of said power piston in response to relative radial movement of said power piston and said valve body to thereby maintain said close contact with said valve body.

5. A brake booster according to claim 4, wherein said bead includes a narrowed relieved portion radially surrounding said lip and directly facing said variable pressure chamber so as to by in direct communication therewith.

6. A brake booster according to claim 1 in which said bead is C-shaped in cross-section, said C-shaped cross-section having axially extending, radially inner and outer legs of substantially equal length respectively pressing against radially opposed parts of said outer peripheral surface of said valve body and said annular portion of said power piston, said inner leg constituting said lip and pressing against said valve body, said C-shaped cross section including a bight extending radially and connecting corresponding ends of said legs, said legs extending in an axial direction beyond said bight, said bight and leg ends occupying a first radial plane, said C-shaped cross-section having a recess facing axially from said bight and extending radially between said legs toward remaining axial ends of said legs, said recess, lip and radially outer leg occupying a second radial plane offest axially from said first radial plane, said recess allowing said outer leg and lip to move toward or away from each other to maintain a seal between said valve body and power piston despite radial expansion or contraction of one of said valve body and power piston with respect to the other.

* * * * *

UNITED STATES PATENT AND TRADEMARK OFFICE
CERTIFICATE OF CORRECTION

PATENT NO. : 4,936,635

DATED : June 26, 1990

INVENTOR(S) : Shozo SAKAGUCHI

It is certified that error appears in the above-identified patent and that said Letters Patent is hereby corrected as shown below:

Col. 4, line 32; change "elatic" to ---elastic---.

Col. 4, line 41; change "by" to ---be---.

Signed and Sealed this

Third Day of December, 1991

*Attest:*

HARRY F. MANBECK, JR.

*Attesting Officer*    *Commissioner of Patents and Trademarks*